INVENTORS
JACK J. REJSA
HENRY N. SCHACHT

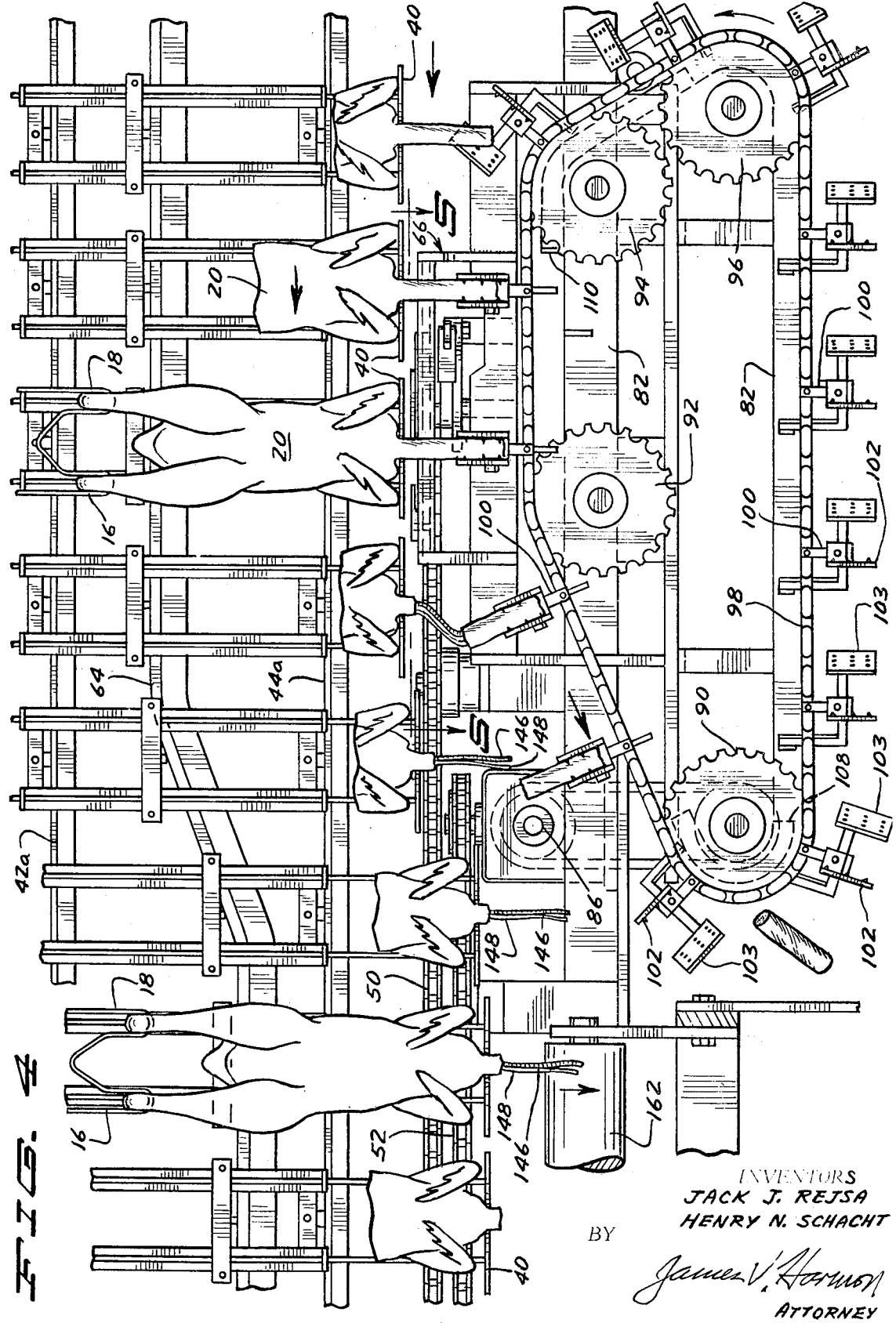

May 12, 1970   J. J. REJSA ET AL   3,510,907
METHOD AND APPARATUS FOR CLEANING ANIMALS SUCH AS POULTRY
Filed March 26, 1968   5 Sheets-Sheet 5
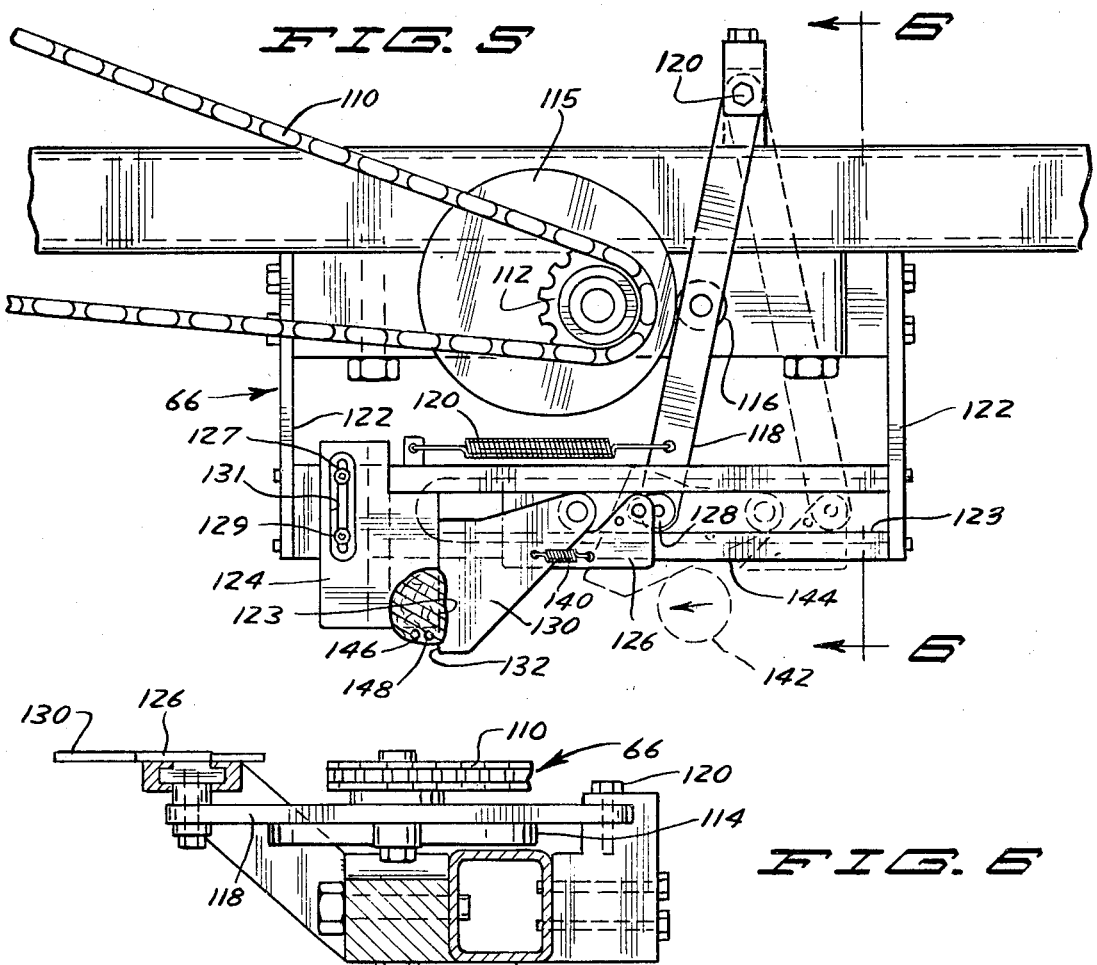
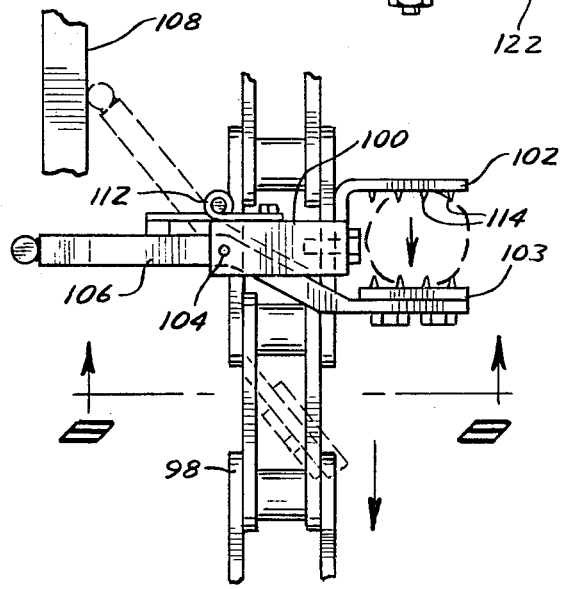
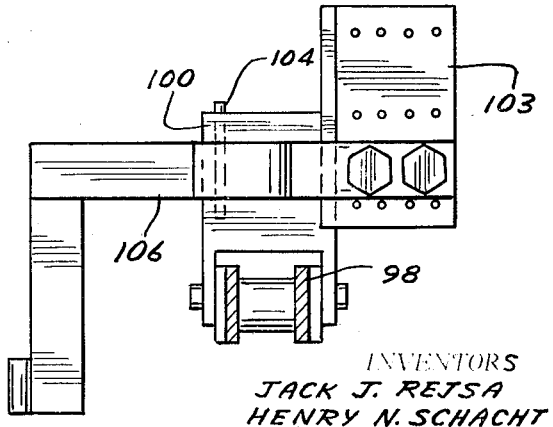
INVENTORS
JACK J. REJSA
HENRY N. SCHACHT
BY
ATTORNEY

United States Patent Office 3,510,907
Patented May 12, 1970

3,510,907
METHOD AND APPARATUS FOR CLEANING ANIMALS SUCH AS POULTRY
Jack J. Rejsa, Minneapolis, Minn., and Henry N. Schacht, Gainesville, Ga., assignors to The Pillsbury Company, Minneapolis, Minn., a corporation of Delaware
Filed Mar. 26, 1968, Ser. No. 716,139
Int. Cl. A22c 21/00
U.S. Cl. 17—11                             9 Claims

ABSTRACT OF THE DISCLOSURE

An apparatus for removing the neck, esophagus and trachea from poultry. A plurality of bird engaging support plates are mounted upon an endless conveyor synchronized with the movement of the birds as they are carried horizontally upon conventional overhead processing conveyor. As the birds are engaged by the plates, a cam elevates each plate to raise the wings and body. A groove in the plate receives and properly locates the neck so that it can be engaged by a cutter designed to only partially sever the neck at its base leaving the esophagus and trachea in tact. Jaws grasp and remove the neck but leave the trachea and esophagus which are then engaged by a pair of cooperative knurled rollers that withdraw them from the body cavity.

---

The present invention relates to the cleaning of animals and more particularly to the removal of the neck, trachea and esophagus from poultry.

A typical high-speed eviscerating line for poultry that is capable of handling about 3,000 birds per hour often requires as many as 4 people for the manual removal of the trachea, esophagus and neck. In the past, this operation has been performed with a shears by making a cut at the base of the neck of sufficient depth to expose the trachea and esophagus which one or more of the operators then removes by grasping and withdrawing them through the cut from both the neck and the body cavity. The neck itself is then cut with an ordinary knife and removed. In addition to being an unpleasant and time consuming task, this operation adds significantly to the cost of processing.

The present invention has the following objects: (a) a provision for reliably and rapidly removing the neck from the poultry and for removing the trachea and esophagus from the body cavity; (b) a provision for reliably removing the esophagus and trachea initially from the neck and immediately thereafter from the body cavity; (c) a provision for removing unwanted parts of the bird without injuring either the neck or the body; (d) a provision for making a cut between the base of the neck and the body at a more accurate and consistently positioned location than could be achieved heretofore; (e) a provision for retaining the wings in an out-of-the-way position as the neck is cut; (f) a means for synchronizing the operation of the apparatus with the overhead conveyor presently employed to permit reliable operation during start-up and speed changes; (g) a provision for handling poultry of different sizes; (h) a provision for cutting the neck without severing the esophagus and trachea; (i) a means for segregating and transferring the trachea and esophagus to one storage location and the neck to another storage location.

These and other more detailed and specific objects will become apparent in view of the following specification and drawings wherein:

FIG. 4 is an enlarged front elevational view taken on line 4—4 of FIG. 3.

FIG. 5 is an enlarged plan view of the neck cutting assembly.

FIG. 6 is a vertical sectional view taken on line 6—6 of FIG. 5.

FIG. 7 is a plan view of one of the neck clamping units, and

FIG. 8 is a transverse sectional view taken on line 8—8 of FIG. 7.

To the accomplishment of the foregoing and related ends the invention then comprises the features hereinafter fully described and particularly pointed out in the claims, the following description setting forth in detail certain illustrative embodiments of the invention, these being indicative, however, of but a few of the various ways in which the principles of the invention may be employed.

The present invention will be described in connection with the removal of necks from poultry and in particular broiler chickens. It should be understood, however, that it can be employed with other forms of poultry such as duck, geese, turkeys, etc.

Figure 1:
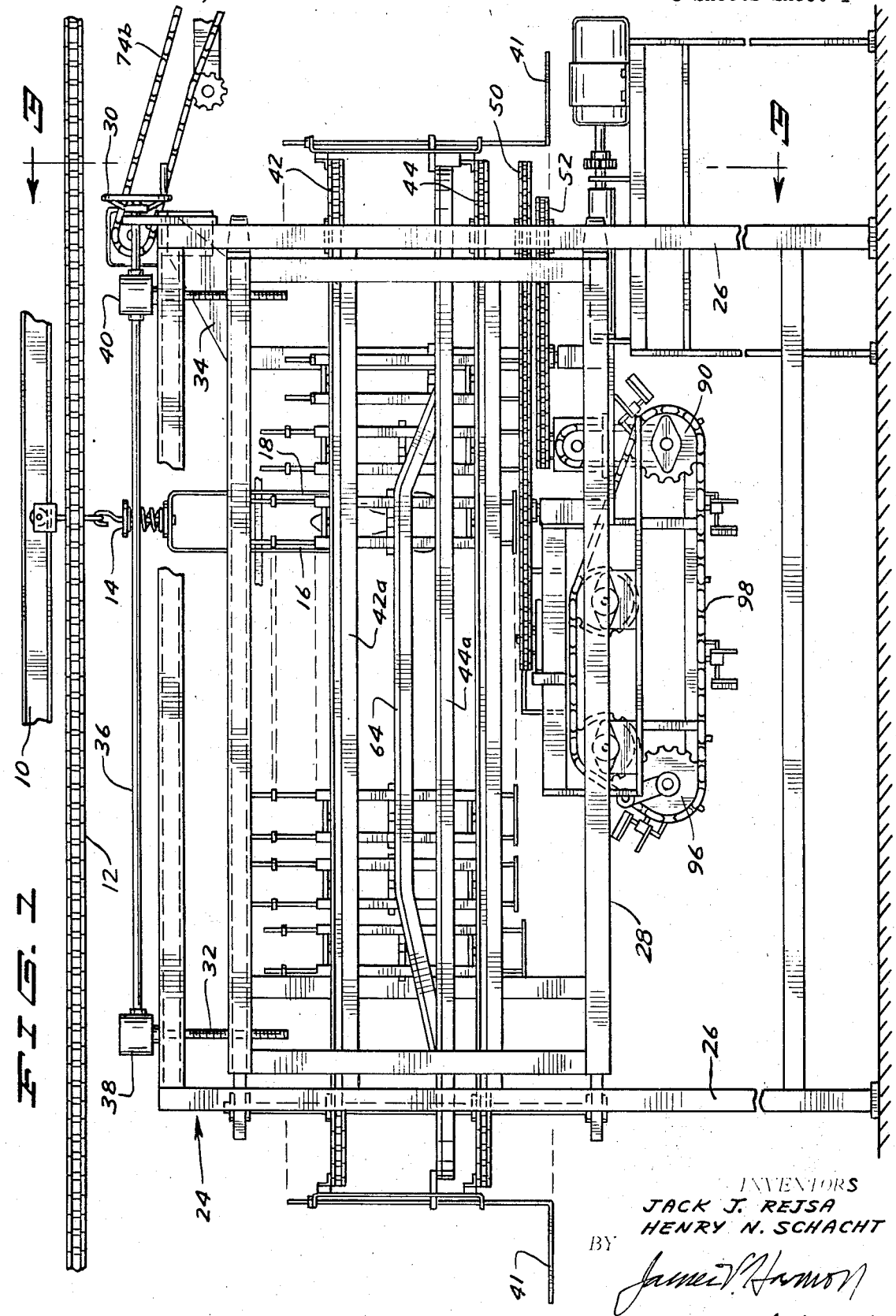
FIG. 1 is a side elevational view of an apparatus embodying the invention.
Figure 2:
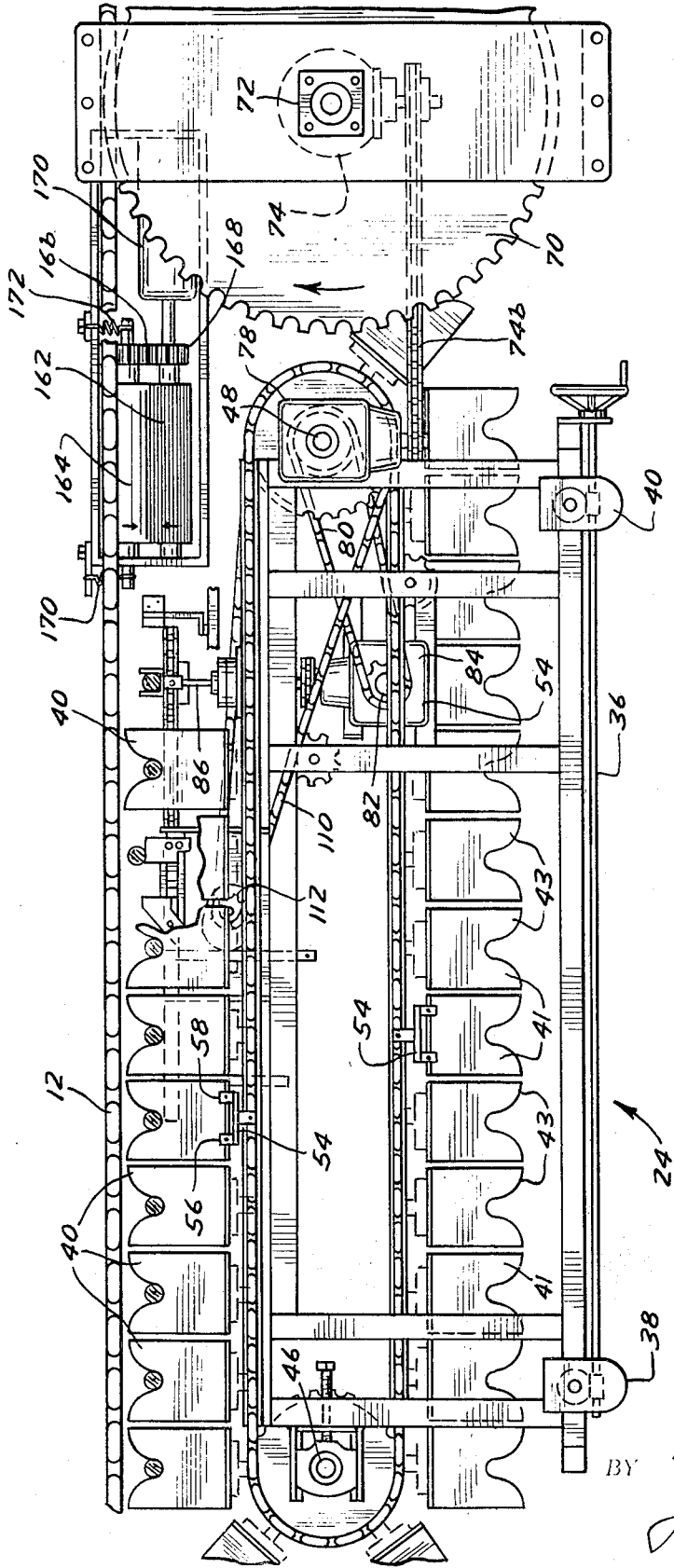
FIG. 2 is a plan view of the apparatus.
Figure 3:
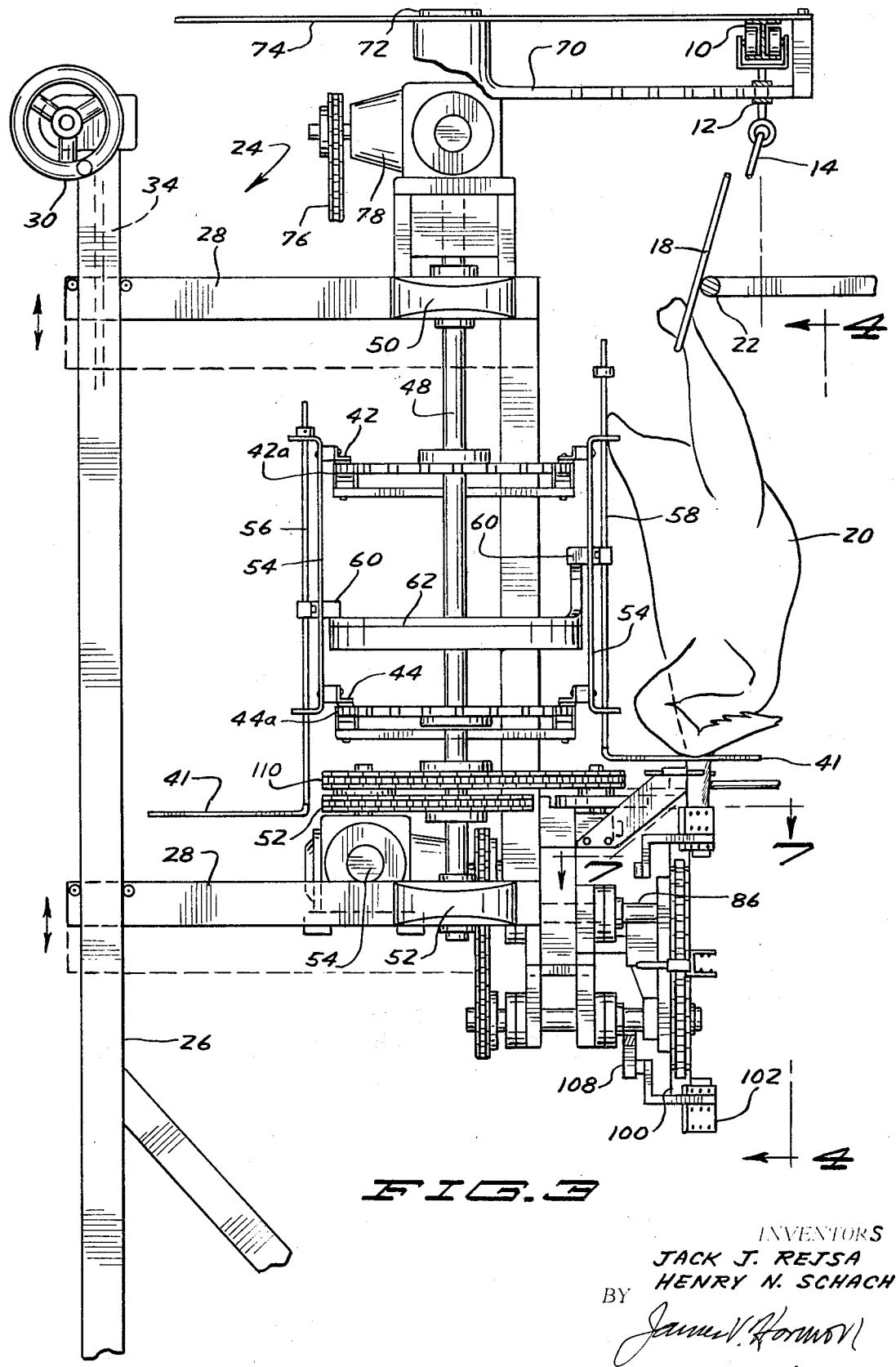
FIG. 3 is an end elevational view taken on line 3—3 of FIG. 1.

As shown in FIGS. 1 and 3, the poultry being processed is carried through the plant, past the apparatus embodying the invention by means of an overhead conveyor rail 10 and an elongated conveyor chain 12 to which a plurality of longitudinally spaced shackles 14 are secured. The shackles are entirely conventional. Each is provided with the two wire loops 16 and 18 of just the proper size to securely engage the epiphysis of the tibia of the chickens 20 which at this stage of the operation have been cleaned and the viscera removed with the exception of the lungs. A deflection bar 22 (FIG. 3) is provided for moving the shackles 14 laterally toward the apparatus of the invention which is indicated generally at 24. The apparatus 24 includes a supporting framework 26 upon which is mounted a vertically movable carriage 28 that can be raised or lowered by means of a hand wheel 30 that is coupled to screw jacks 32 and 34 by means of a shaft 36 and right angle gear boxes 38 and 40 so that the carriage 28 can be raised or lowered until the part of each chicken 20 adjacent the base of the neck just engages the upper surface of one of a plurality of horizontally disposed orientation plates 41. As seen in FIGS. 2 and 3, neck orientation members or orientation plates 41 are mounted upon an endless chain conveyor composed of vertically spaced endless conveyor chains 42 and 44 supported on suitable chain sprockets affixed to vertically disposed shafts 46 and 48, each of which is mounted for rotation on a vertical axis by the provision of suitable bearings 50 and 52 (only two of which are shown) that are affixed at their upper and lower ends to the carriage 28. The orientation plates 41 are generally rectangular as seen from above and each includes a centrally extending outwardly facing neck engaging recess 43 within which the birds' neck rests. In this way each neck is precisely positioned as shown in FIG. 2. The chains 42 and 44 are supported in troughs 42a and 44a.

The mounting of the orientation plates 41 will now be described. As best seen in FIG. 3, brackets 54 are secured to chains 42 and 44. These brackets are provided with two pairs of vertically spaced openings through which vertically positioned pairs of wires 56 and 58 are free to slide. The lower ends of the wires 56 and 58 are rigidly secured as by welding to the orientation plates 41 so that the brackets are advanced by the chains 42 and 44. The vertical position of the orientation plate 41 is determined by a cam follower 60 that rests upon the upper surface of an endless oval cam rail 62 (FIG. 1).

When the orientation plate 41 is elevated, it engages the parts of the body of the chicken adjacent to the neck and as it lifts these parts the base of the neck effectively it is exposed for the subsequent cutting operation.

Thus, as the cam followers 60 engage the raised section 64 of the cam 62, the orientation plates 41 are raised thereby locating the neck at precisely the correct elevation for entry into the cutting assembly 66 (FIGS. 5 and 6). It also raises the wings to an out-of-the-way position as seen in FIG. 4.

The apparatus 24 can be driven in any suitable manner provided it is synchronized with the conveyor chain 12. This is conveniently done by providing a sprocket 70 supported on a bearing 72 affixed to the overhead mounting plate 74 (FIG. 3) in the proper position to engage chain 12. In this way movement of the chain 12 will rotate sprocket 70. Rotation of the sprocket 70 drives the apparatus 24 via a transmission including a gear box 74 and roller chain 74b (FIGS. 2 and 3) and a gear box 78 which is affixed to the shaft 48.

From gear box 78 a roller chain 80 extends to a shaft 82 which is coupled to a right angle gear box 84. The gear box 84 is, in turn, coupled to a neck clamping mechanism by means of a shaft 86 (FIGS. 2 and 4).

The neck clamping mechanism will now be described with particular reference to FIGS. 4, 7 and 8. As best seen in FIG. 4, four sprockets 90, 92, 94 and 96 are mounted for rotation on the carrriage 28. Entrained over sprockets 90 to 96 is a roller chain 98 to which are secured a plurality of longitudinally spaced brackets 100. Upon each bracket 100 are mounted a pair of clamp jaws, one designated 102 being rigidly secured to bracket 100 and the other 103 being pivoted at 104 to the bracket 100. The latter includes an actuator arm 106 adapted to engage cam members 108 and 110 (FIG. 4) when each clamp is to be opened. Each pair of jaws is otherwise held in the closed position by a torsion spring 112 (FIG. 8). As shown in FIG. 4 when the clamps engage the cam 108, the jaws are opened and because each pair of jaws is positioned in vertical alignment with one of the orientation plates 41, one clamp will be positioned to engage the neck of each chicken 20. When the actuating arm reaches the end of the cam 110, each jaw is closed by spring 112 thereby engaging the pointed gripping pins 114 against the sides of the neck. The clamp will remain engaged on each neck until the actuating arm 106 reaches the upper end of the cam 108 thereby stripping the necks from the body while leaving the trachea and esophagus in place as the jaws move downwardly toward sprocket 90.

The cutting assembly will now be described with particular reference to FIGS. 5 and 6. The cutting assembly 66 is driven in synchronization with the endless conveyor composed of endless chains 42 and 44 by means of a roller chain 110 extending from a sprocket on the shaft 48 to a sprocket 112 to which is also connected a cam 115 positioned to rest against a cam follower 116 on an arm 118 that is mounted for pivotal movement on a pin 120. The free end of the arm 118 is yieldably biased towards the left as seen in FIG. 5 by a spring 120 secured at its other end to a supporting framework 122. A guiding slot 123 provided on the framework 122 has mounted in it for sliding movement a shuttle 126 to which the free end of the arm 118 is coupled by means of a link 128 that is pivoted at one end of the arm 118 and at the other end to the shuttle 126. Also pivotally connected to the shuttle 126 is a cutting plate 130 having a flat cutting surface 132 which when in the closed or cutting position abuts against a sharpened edge 123 of a cutting blade 124 that is itself affixed by means of bolts 127 and 128 to the framework 122. The necks of the chickens rest in the recesses 43. The distance that blade 124 projects beyond the bottom of recess 43 is carefully controlled as described below. The bolts extend through a slot 131 in the blade which enables the position of the blade 124 to be adjusted at right angles to the movement of the cutting plate 130.

A weak spring 140 connected between the follower 126 and the cutting plate 130 tends to swing the cutting plate in a counterclockwise direction as seen in FIG. 5. In operation, as the cam 115 rotates, the arm 118 will oscillate at a predetermined velocity and in a predetermined timed relationship with respect to the movement of the chickens as they travel from right to left as seen in the figures past the cutter. Thus, as the arm 118 swings to the right engagement of the plate 130 with the neck at the position indicated at 142 will swing upwardly until the neck has cleared the left end of the plate. The spring 140 will then swing the plate downwardly to the solid line position at which time the arm 118 will begin to swing toward the left in the figures thereby severing the portion of the neck that is between the blade 124 and the cutting plate 130. It should be noted that the amount of the blade 124 that is projecting outwardly beyond the edge 144 of the framework 122 and the bottom of each recess 43 is somewhat less than that necessary to cut entirely through the neck. Accordingly, the cut will terminate short of the ventral surface of the neck leaving the trachea 146 and esophagus 148 uncut.

When the neck is engaged by the clamp mechanism and removed as shown in FIG. 4, the trachea 146 and esophagus 148 remain in position with their upper ends in place in the body cavity. As the birds continue to move toward the left in the figures, the esophagus and trachea are engaged in the nip between the knurled rollers 162 and 164 and withdrawn from the body (FIGS. 2 and 4). The rolls are coupled by spur gears 166 and 168 and driven by means of a motor 170. The roll 164 is yieldably held against the roll 162 by springs 170 and 172.

It is apparent that many modifications and variations of this invention as hereinbefore set forth may be made without departing from the spirit and scope thereof. The specific embodiments described are given by way of example only.

We claim:

1. A neck cutting apparatus for vertebrate animals comprising in combination a supporting framework, orientation means on the supporting framework having a recess for receiving the neck of the animal that is to be cut and support surface positioned to engage the portions of the body of the animal adjacent the neck, cutting blade means positioned adjacent the orientation means, said cutting blade means being positioned to produce a cut in the neck that terminates short of the ventral surface of the neck to thereby leave the windpipe and esophagus uncut when the neck is cut, a means for clamping and stripping the neck away from the body without removing the trachea and esophagus and a means positioned adjacent the cutting means for receiving and engaging the esophagus and trachea after the neck has been stripped away for withdrawing the windpipe and esophagus out of the body cavity.

2. The apparatus according to claim 1 wherein the orientation means comprise orientation plates each having a recess in one side thereof for receiving the neck.

3. The apparatus according to claim 2 wherein a plurality of orientation plates are mounted on an endless conveyor, each plate in a horizontal plane adapted to successively engage a plurality of horizontally aligned linearly arranged vertebrate animals with the neck of each animal in one such recess and the positions of the plate on either side thereof in engagement with the body of the animal on either side of the neck.

4. The apparatus according to claim 2 wherein the orientation plates are mounted for vertical movement and means is provided for elevating the plates to lift contacting portions of the body to thereby expose the neck at its base whereby the neck can be effectively cut at a point closely adjacent to the body of the animal.

5. The apparatus of claim 1 wherein the cutting blade means comprises a blade member and a flat cutting plate positioned to engage the blade at times and a drive means connected to either the plate or the blade for moving the plate and blade together or away from one another in timed relationship to the movement of vertebrate animals past the cutting apparatus whereby the neck of each animal is cut just as it takes a position between the plate and the blade.

6. The apparatus according to claim 1 wherein the means for removing the trachea and esophagus comprises a pair of aligned rolls mounted for rotation and driven in a direction adapted to engage and withdraw the trachea and esophagus from the body cavity when they become caught in the nip between said rolls.

7. The apparatus according to claim 6 wherein one of the rolls is resiliently urged toward the other of said rolls to securely engage the trachea and esophagus when positioned therebetween.

8. The apparatus according to claim 3 wherein the animals are supported upon a primary conveyor in horizontal and linear alignment and are carried by the primary conveyor at a uniform velocity past the apparatus, a sprocket is operatively associated between the endless conveyor and the primary conveyor for driving the endless conveyor at the same speed and in the same direction as the primary conveyor and a drive means is operatively associated between the sprocket and the cutting blade means for driving the cutting blade means at a predetermined speed required to cut each neck as it passes the cutting blade means.

9. The apparatus of claim 5 wherein a means is provided to support the neck in a predetermined position relative to the blade and the plate and a releasable fastening means is provided to change the extension of the blade along the dorso-ventral axis of the neck whereby the cut can be terminated short of the trachea and esophagus.

References Cited

UNITED STATES PATENTS

| 2,854,690 | 10/1958 | O'Donnell | 17—52 |
| 2,926,383 | 3/1960 | Steck | 17—11 |
| 3,056,161 | 10/1962 | Zebarth | 17—11 |
| 3,201,823 | 8/1965 | Mathews | 17—11 |
| 3,233,280 | 2/1966 | Loftus | 17—11 |
| 3,243,842 | 4/1966 | Norwood | 17—52 |
| 3,277,514 | 10/1966 | Hooley | 17—11 |

LUCIE H. LAUDENSLAGER, Primary Examiner

U.S. Cl. X.R.

17—52